United States Patent [19]
Noel

[11] Patent Number: 5,273,359
[45] Date of Patent: Dec. 28, 1993

[54] REMOTE HIGH-TEMPERATURE INSULATORLESS HEAT-FLUX GAUGE

[75] Inventor: Bruce W. Noel, Espanola, N. Mex.

[73] Assignee: The United States of America as represented by the United States Department of Energy, Washington, D.C.

[21] Appl. No.: 976,018

[22] Filed: Nov. 13, 1992

Related U.S. Application Data

[63] Continuation-in-part of Ser. No. 862,886, Apr. 3, 1992, abandoned.

[51] Int. Cl.$^5$ .......................................... G01K 17/00
[52] U.S. Cl. ........................................ 374/29; 374/30
[58] Field of Search ................ 374/29, 30, 31, 43, 374/161, 44

[56] References Cited

U.S. PATENT DOCUMENTS

| | | | |
|---|---|---|---|
| 4,577,976 | 3/1986 | Hayashi et al. | 374/30 |
| 4,621,929 | 11/1986 | Phillips | 374/20 |
| 4,722,609 | 2/1988 | Epstein et al. | 374/30 |
| 4,779,994 | 10/1988 | Diller et al. | 374/29 |
| 4,812,050 | 3/1989 | Epstein et al. | 374/29 |
| 4,986,671 | 1/1991 | Sun et al. | 374/29 |
| 5,005,984 | 4/1991 | Noel et al. | 374/29 |
| 5,026,170 | 6/1991 | Noel et al. | 374/29 |
| 5,044,765 | 9/1991 | Noel et al. | 374/29 |

FOREIGN PATENT DOCUMENTS

| | | | |
|---|---|---|---|
| 2758994 | 7/1979 | Fed. Rep. of Germany | 374/29 |
| 0587996 | 5/1947 | United Kingdom | 374/29 |

OTHER PUBLICATIONS

K. A. Wickersheim et al., "Optical Temperature Measurement," Industrial Research/Development (Dec. 1979).

Primary Examiner—William A. Cuchlinski, Jr.
Assistant Examiner—Diego F. F. Gutierrez
Attorney, Agent, or Firm—Milton D. Wyrick; Paul D. Gaetjens; William R. Moser

[57] ABSTRACT

A remote optical heat-flux gauge for use in extremely high temperature environments is described. This application is possible because of the use of thermographic phosphors as the sensing media, and the omission of the need for an intervening layer of insulator between phosphor layers. The gauge has no electrical leads, but is interrogated with ultraviolet or laser light. The luminescence emitted by the two phosphor layers, which is indicative of the temperature of the layers, is collected and analyzed in order to determine the heat flux incident on the surface being investigated. The two layers of thermographic phosphor must be of different materials to assure that the spectral lines collected will be distinguishable. Spatial heat-flux measurements can be made by scanning the light across the surface of the gauge.

10 Claims, 2 Drawing Sheets

REMOTE HIGH-TEMPERATURE INSULATORLESS HEAT-FLUX GAUGE

The invention is a result of a contract with the Department of Energy (Contract No. W-7405-ENG-36).

This is a continuation-in-part application out of patent application Ser. No. 07/862,886, filed Apr. 3, 1992, now abandoned.

This invention relates generally to the measurement of heat flux, that is the measurement of the amount of heat transferred across a surface per unit area per unit time, and, more specifically, to the measurement of heat flux at high temperatures, utilizing the optical properties of thermographic phosphors without need for an insulator.

The measurement of heat flux is important in many experimental situations, such as those where heat transfer must be limited and therefore monitored. For example, accurate measurement of heat-transfer rates is considered critical to the design improvements envisioned for high-pressure turbine engines. Improved understanding of the effects that contribute to heat load can lead to increased efficiency. Of particular interest is the heat transferred from the free-stream gas to an engine component surface. Examples include turbine blades and vanes.

Previous heat-flux gauges have principally involved some form of resistance-thermometer temperature sensor applied on both sides of an insulating medium. These sensors, which are conducting surfaces, can also be made from pairs of materials in a thermocouple configuration. Leads connected to these surfaces carry an electrical current which is proportional to the surface temperature detected by the sensor to an external instrument which would measure the temperatures of the surfaces. A typical gauge is made by depositing thin layers of an electrically and thermally conductive material onto both sides of a thin sheet of insulating material such as MYLAR ®, or KAPTON ®.

Heat flux, Q, incident on an ideal gauge made in this way is given by the following equation $$Q = k(\Delta T)/L, \quad \quad 10$$

where k is the thermal conductivity of the insulator, L is the thickness of the insulator, and $\Delta T$ is the temperature difference between the two conductive surfaces. This equation assumes that the conductive surfaces are infinitely conducting and infinitely thin.

Modern embodiments of this configuration are disclosed in U.S. Pat. Nos. 4,779,994, 4,722,609, and 4,577,976.

U.S. Pat. No. 4,779,994 to Diller, et al. discloses a fairly conventional heat-flux gauge which utilizes thin-film layers applied to each side of a planar thermal-resistance element, with its "cold" junctions applied to one surface and its "hot" junctions applied to the other. The use of thin films allows the deposition of a large number of junctions onto a small surface area which can be interconnected in series. Of course, these junctions are of the electrical-resistance type, and require electrical connections.

U.S. Pat. No. 4,722,609 to Epstein et al. discloses a double-sided, high-frequency-response heat-flux gauge consisting of a metal film approximately 1500 angstrom thick applied to both sides of a thin (25 $\mu$m) polyimide sheet. At low frequencies, the temperature difference across the polyimide is a direct measure of the heat flux. At higher frequencies, a quasi-one-dimensional assumption is used to infer the heat flux. Numerous such gauges are arranged in a serpentine pattern and applied to the surface of a turbine blade.

Yet another thin-film heat-flux gauge is disclosed in U.S. Pat. No. 4,577,976 to Hayashi et al. wherein a pair of metallic thin films are attached to opposite surfaces of a heat-resistive thin film. The heat flux through the heat-resistive film is determined by measuring the temperature gradient therein while using the metallic thin films as resistance-thermometer elements.

The pervading problem plaguing the above heat-flux gauges, as well as other similar prior art heat-flux gauges, is that they are electrically based. Thus, they all require connecting wires of some type in order to operate. This complicated their use, and limits their application to rotating components, where wire connections would have to be made through slip rings. This complicates such an application, and detracts from its reliability.

Connecting leads or wires of the prior art also limit the spatial resolution when multiple heat-flux gauges are needed to measure the spatial distribution of heat flux. The degree of complication, because of the inherent geometry of such electrically based gauges, effectively precludes their use in measuring the spatial distribution of heat flux with acceptable resolution and area coverage. Wiring dozens of gauges is complicated and interferes with the natural heat transfer to or from the surface under test. Connecting wires also present problems when such gauges are used in hostile environments.

The current invention solves the problems of the prior art by providing a leadless heat-flux gauge that uses light instead of electrical means as its interrogating medium. The sensing elements of the gauges are thermographic phosphors, whose emission lines in the luminescence spectrum are temperature dependent. This allows accurate temperature determination when the phosphors are interrogated by ultraviolet (uv) light, and the spectral lines of the emitted light are analyzed. It also allows for a heat-flux gauge requiring no electrical connections between the gauge and the associated evaluation and display equipment.

Applicant is a co-inventor in three related U.S. Pat. No. 4,912,355, issued Mar. 27, 1990, U.S. Pat. No. 5,005,984, issued Apr. 9, 1991, and U.S. Pat. No. 5,044,765, issued Sep. 3, 1991. These patents deal with different configurations of optically interrogated heat-flux gauges. As with the present invention, the gauges are based on thermographic phosphors, arranged in a sandwich fashion. These earlier gauges have a transparent plastic insulator between adjacent phosphor layers. Although these gauges perform properly in low to medium-temperature environments, the melting point of the insulation makes them unsuitable for high-temperature application.

It is therefore an object of the present invention to provide apparatus for the accurate measurement of heat flux in high-temperature environments.

It is another object of the present invention to provide a heat-flux gauge which requires no plastic insulator between adjacent thermographic-phosphor layers.

It is yet another object of the present invention to provide a heat-flux gauge that does not require electrical connections.

It is still another object of the present invention to provide a heat-flux gauge that will operate in a hostile environment.

It is still another object of the present invention to provide a heat-flux gauge that is interrogated with light.

Additional objects, advantages and novel features of the invention will be set forth in part in the description that follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention comprises an optically interrogated gauge for measuring heat flux incident on a surface comprising a first thermographic phosphor in direct contact with the surface, with a second thermographic phosphor overlying the first thermographic phosphor. Light means are incident on the first and second thermographic phosphors, for producing first luminescence from the first thermographic phosphor and second luminescence from the second thermographic phosphor. Collecting means collect the first and second luminescences, wherein the first luminescence and the second luminescence are indicative of the temperatures of the first and second thermographic phosphors. Computing means are connected to the collecting means for determining heat flux on the surface using numerical differences between the temperatures of the first and second thermographic phosphors.

In a still further aspect of the present invention, and in accordance with its objects and purposes, a method of determining heat flux incident on a surface comprises the steps of depositing a first thermographic phosphor on said surface, and depositing a second thermographic phosphor over the first thermographic phosphor; illuminating the second thermographic phosphor and the first thermographic phosphor with light to produce first luminescence from the first thermographic phosphor and second luminescence from the second thermographic phosphor; collecting the first and second luminescences; and computing the heat flux incident on the surface from information contained within the first and second luminescences.

BRIEF DESCRIPTION OF THE DRAWINGS

The accompanying drawings, which are incorporated in and from a part of the specification, illustrate the embodiments of the present invention and, together with the description, serve to explain the principles of the invention. In the drawings.

DETAILED DESCRIPTION

The present invention provides a heat-flux gauge which can be deployed in high-temperature environments, and which does not require any electrical leads. The above referenced patents on which the applicant is a co-inventor disclose optical heat-flux gauges employing thermographic phosphors with an insulator between phosphor layers. However, a problem exists if these gauges are used in high-temperature environments, in that the insulator can melt at high temperatures. The present invention improves on these patents and discloses a gauge which has no insulator.

Figure 1:
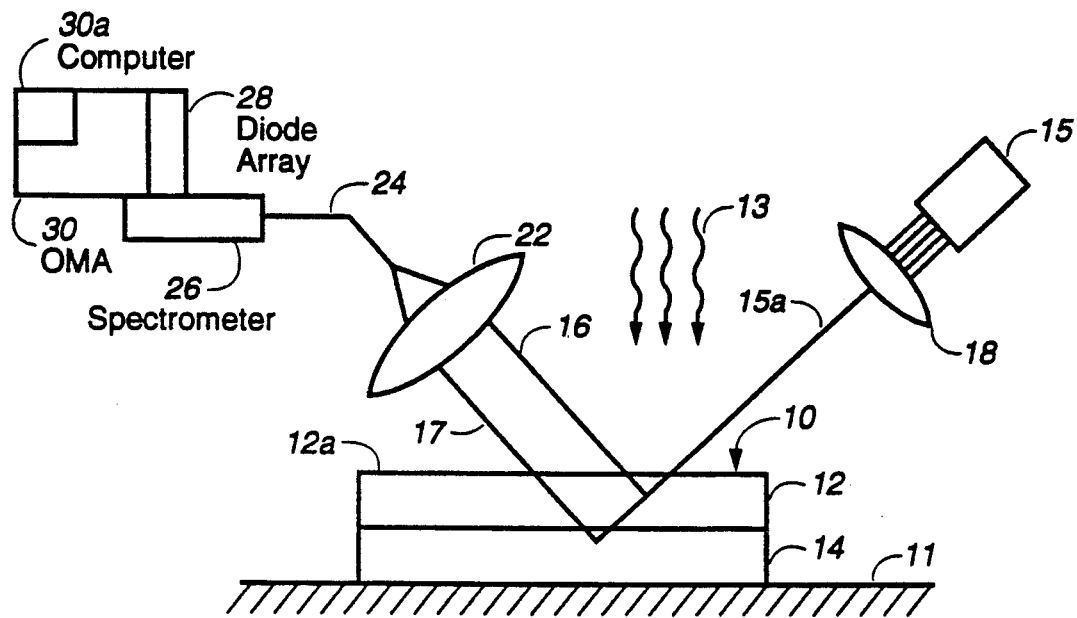
FIG. 1 is a schematic illustration of an optical heat-flux gauge according to the present invention applied to a surface.

The new heat-flux gauge can be best understood by referring to FIG. 1, where a schematic illustration of optical heat-flux gauge 10 applied to a surface 11 according to the present invention is shown. Optical heat-flux gauge 10 comprises thermographic-phosphor layer 12 and thermographic-phosphor layer 14, without any intervening insulator.

As shown, heat flux 13 is incident on optical heat-flux gauge 10, as is light from light source 15 which is focused onto heat-flux gauge 10 by lens 18. Heat flux 13, in passing through gauge 10 into surface 11, will create linear temperature gradients across phosphor layer 12 and phosphor layer 14, as is required for heat-flux determination. The heat-flux quantity, Q, for a gauge not having an insulative layer is determined by formulae which will be derived below.

Attention should now be redirected to FIG. 1. In passing through phosphor layers 12, 14, the light from light source 15 is absorbed exponentially throughout each layer, and is proportional to the optical-absorption coefficient, $\alpha$. The intensity of the light at any depth, x, within each layer 12, 14 can be represented as $$I = I_0 e^{-\alpha x} \qquad , 11$$

where $I_0$ represents the initial intensity of light absorbed from light source 15, and $\alpha$ is the optical absorption coefficient.

For the reason that luminescence is generated at each point within thermographic layers 12, 14 which is traversed by light from light source 15, the emitted luminescence 16, 17 from layers 12, 14 respectively is actually emitted from a distribution of points within layers 12, 14. This results in luminescence 16, 17 appearing to come, on average, from a point within each of layers 12, 14. When layer 12 and layer 14 are at different temperatures, as they are when heat flux 13 is incident on surface 11, there exists a linear temperature gradient across each layer 12, 14. Thus, with this knowledge, and the knowledge about luminescence 16, 17 appearing to emanate from a point in each layer 12, 14, one can determine the temperature at any point within each layer 12, 14. The two temperature points needed for determining the heat flux are the temperature at the interface between surface 11 and layer 14 and the temperature at top surface 12a of layer 12. With knowledge of these two temperatures, and of the thermal conductivities, optical absorption coefficients, and thicknesses of thermographic-phosphor layers 12, 14, heat flux 13 can be calculated by inserting the values into the formulae developed herein. This allows the present invention to perform as a remote, insulatorless heat-flux gauge capable of performing in high-temperature environments.

Figure 2:
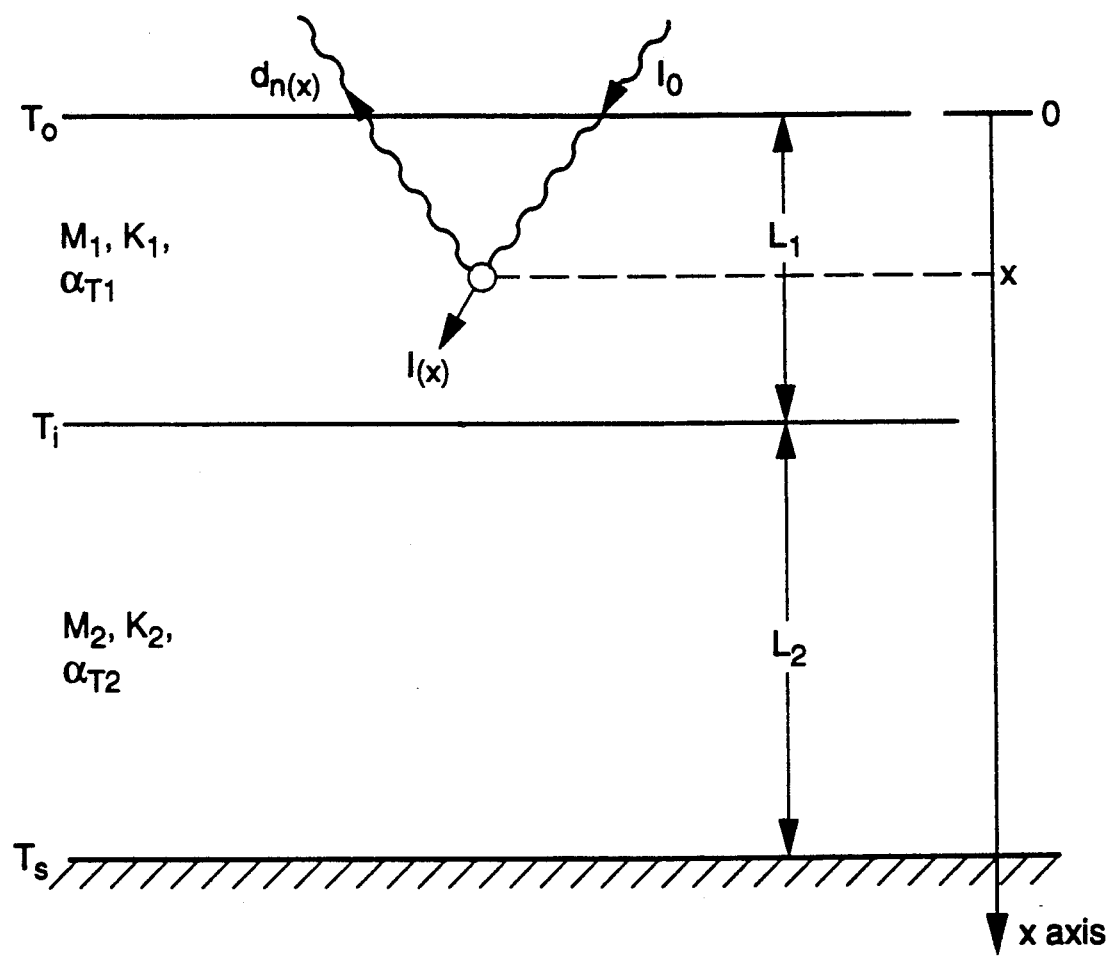
FIG. 2 is a schematical representation of the thermographic-phosphor layers applied to a surface according to the present invention, together with heat flux and interrogating light incident on the layers.

In developing this derivation, it will be helpful to refer to FIG. 2, wherein a labeled schematical view of phosphor layer 12 overlying phosphor layer 14, which is adjacent to surface 11. For the purposes of this derivation, phosphor layer 12 is referred to as Material 1, or $M_1$, and phosphor layer 14 is referred to as Material 2, or $M_2$. Following is a list of terms to be used in the derivation:

$K_1$ = thermal conductivity of $M_1$;
$K_2$ = thermal conductivity of $M_2$;
For each material, $M_1$, $M_2$:
$\alpha_{tu}$ = total ultraviolet (uv) absorption coefficient = $\alpha_{au} + \alpha_{pu}$;
$\alpha_{au}$ = the contribution to $\alpha_{tu}$ corresponding to nonradiative uv absorption;
$\alpha_{pu}$ = the contribution to $\alpha_{tu}$ corresponding to radiative absorption, that is radiation which results in the emission of an optical photon;
$\alpha_{to}$ = total optical absorption coefficient;
$\alpha_{to} \approx \alpha_{ao}$, the contribution to $\alpha_{to}$ that corresponds to nonradiative optical absorption (the assumption, which is borne out through experiment, is that virtually no optical photons result from optical absorption);
$G$ = a largely geometric factor that determines the fraction of optical radiation created by $M_1$ and $M_2$ that arrives at a detector exterior to $M_1$ and $M_2$.
$L$ = the thickness of each material, $M_1$ and $M_2$.
$I_o$ = the intensity of the uv light incident on $M_1$.

As $I_o$ passes through $M_1$, it is absorbed according to the classical absorption law, so the intensity of $I_o$ at a point x, within $M_1$, is given by $$I_1(x) = I_o e^{-\alpha_{tu1} x}. \qquad 12$$

The probability of a photon created at x arriving at an external detector after being subject to absorption is $$P_1(x) = G_1(x) e^{-\alpha_{au1} x}. \qquad 13$$

Then the differential number of photons emitted from the surface of $M_1$ is given by $$dn = \alpha_{pu1} I_1(x) P_1(x) dx, \qquad 14$$

and the total number of photons emitted from $M_1$ is $$N_{01} = \alpha_{pu1} I_o G_1 \int_0^L e^{-\alpha_{tu1} x} e^{-\alpha_{au1} x} dx. \qquad 15$$

The intensity of the uv light at the interface, i, between $M_1$ and $M_2$ (at $x = L_1$) is $$I(L_1) = I_o e^{-\alpha_{tu1} L_1}. \qquad 16$$

By arguments similar to those made above, the number of photons returning to the interface from within $M_2$ is $$N_2(L_1) = I_o e^{-\alpha_{tu1} L_1} \alpha_{pu2} G_2 \int_{L_1}^{L_2} e^{-\alpha_{tu2} x} e^{-\alpha_{au2} x} dx, \qquad 17$$

and the number emitted from the surface of $M_1$ is given by $$N_{02} = N_2(L_1) e^{-\alpha_{au1} L_1}. \qquad 18$$

Substituting the expression of equation 17 for $N_2(L_1)$ into equation 18 yields $$N_{02} = e^{-\alpha_{au1} L_1} I_o e^{-\alpha_{tu1} L_1} \alpha_{pu2} G_2 \int_{L_1}^{L_2} e^{-\alpha_{tu2} x} e^{-\alpha_{au2} x} dx. \qquad 19$$

Evaluating $N_{01}$ and $N_{02}$, we have $$N_{01} = (1 - e^{-A_1 L_1}) \alpha_{pu1} I_o G_1 / A_1 \qquad 20$$

and $$N_{02} = (e^{-A_2 L_1} - e^{-A_2 L_2}) \alpha_{pu2} I_o G_2 e^{-\alpha_{tu1} L_1} e^{-\alpha_{au1} L_1} / A_2, \qquad 21$$

where
$A_1 = \alpha_{tu1} + \alpha_{au1}$ and
$A_2 = \alpha_{tu2} + \alpha_{au2}$.

It is now necessary to determine the depth from which the average photon originates in $M_1$ and $M_2$. Inasmuch as dn may be thought of as a distribution function, the effective depths $X_1$ and $X_2$ are given by the following expressions:

$$X_1 = \frac{\alpha_{pu1} I_o G_1 \int_0^{L_1} e^{-\alpha_{tu1} x} e^{-\alpha_{au1} x} x \, dx}{\alpha_{pu1} I_o G_1 \int_0^{L_1} e^{-\alpha_{tu1} x} e^{-\alpha_{au1} x} dx}, \qquad 22$$

and $$X_2 = \frac{\alpha_{pu2} I_o G_2 e^{-\alpha_{tu1} L_1} e^{-\alpha_{ao1} L_1} \int_{L_1}^{L_2} e^{-\alpha_{tu2} x} e^{-\alpha_{au2} x} x \, dx}{\alpha_{pu2} I_o G_2 e^{-\alpha_{tu L}} e^{-\alpha_{ao1} L_1} \int_{L_1}^{L_2} e^{-\alpha_{tu2} x} e^{-\alpha_{au2} x} dx}. \qquad 23$$

Evaluation of equations 22 and 23 yields $$X_1 = \frac{1 - (L_1 A_1 + 1) e^{-A_1 L_1}}{A_1 (1 - e^{-A_1 L_1})}, \qquad 24$$

$$X_2 = \frac{(L_1 A_2 + 1) e^{-A_2 L_1} - (L_2 A_2 + 1) e^{-A_2 L_2}}{A_2 (e^{-A_2 L_1} - e^{-A_2 L_2})}.$$

Consider a heat flux, Q, per unit area, incident on surface 11. Assuming one-dimensional heat flow, which is reasonable for long, thin insulating materials, the heat flux obeys the standard heat-flux formula (Equation 10) for this case. Since it is continuous, $$Q = (K_1/L_1)(T_0 - T_i) = (K_2/L_2)(T_i - T_3), \qquad 25$$

and $$Q = (K_1/X_1)(T_0 - T(X_1)) = (K_2/X_2)(T_i - T(X_2)) \qquad 26$$

where $T(X_1)$ and $T(X_2)$ are the temperatures measured at an effective distance x into the phosphor materials, by the fluorescence coming from the phosphor materials. Equations 25 and 26 can be solved for $T_i$ as follows:

$$T_i = (K_1/K_2)[T_0 - T(X_1)] + T(X_2). \qquad 27$$

It is also to be noted that:

$$T(X_1) = T_0 - \frac{(T_0 - T_i) X_1}{L_1}, \qquad 28$$

-continued and $$T(X_2) = T_i - \frac{(T_i - T_s)X_2}{L_2}. \quad 29$$

Solving Equation 28 for $T_0$, and substituting Equation 27, yields $$T_0 = \frac{\left(1 + \frac{K_1 X_2}{K_2 L_1}\right)T(X_1) - \frac{X_1}{L_1} T(X_2)}{1 - \frac{X_1}{L_1} + \frac{K_1 X_2}{K_2 L_1}}. \quad 30$$

It is now necessary to substitute Equation 30 into Equation 26, which yields $$Q = \frac{K_1}{L_1} \cdot \frac{T(X_1) - T(X_2)}{1 - \frac{X_1}{L_1} + \frac{K_1 X_2}{K_2 L_1}}. \quad 31$$

Now, all expressions for the quantities necessary to calculate heat flux on surface 11 using thermographic-phosphor layers without an intervening insulator are at hand. The important expressions are summarized below:

$$Q = \frac{K_1}{L_1} \cdot \frac{T(X_1) - T(X_2)}{1 - \frac{X_1}{L_1} + \frac{K_1 X_2}{K_2 L_1}}. \quad 32$$

$$X_1 = \frac{1 - (L_1 A_1 + 1)e^{-A_1 L_1}}{A_1(1 - e^{-A_1 L_1})}, \quad 33$$

$$X_2 = \frac{(L_1 A_2 + 1)e^{-A_2 L_1} - (L_2 A_2 + 1)e^{-A_2 L_2}}{A_2(e^{-A_2 L_1} - e^{-A_2 L_2})}. \quad 34$$

$$A_1 = \alpha_{tu1} + \alpha_{au1}, \quad 35$$

$$A_2 = \alpha_{tu2} + \alpha_{au2}, \quad 36$$

where Q is the desired measurement of heat flux; $K_1$ and $K_2$ are the measurable thermal conductivities of the thermographic-phosphor layers; $L_1$ and $L_2$ are the measurable thicknesses of the thermographic-phosphor layers; $\alpha_{tu1}$, $\alpha_{tu2}$, $\alpha_{au1}$ and $\alpha_{au2}$ are the measurable absorption coefficients of the thermographic-phosphor layers; and $T(X_1)$ and $T(X_2)$ are temperatures indicated by the thermographic-phosphor layers.

It should be noted that, for any insulatorless gauge design, the quantities for K, L, and $\alpha$ are fixed quantities, that when combined, yield a calibration factor such that $$Q = C[T(X_2) - T(X_1)]. \quad 37$$

Therefore, once the calibration factor is known, a gauge according to the present invention obeys a formula for heat flux that is analogous to Equation 10.

Optical heat-flux gauge 10, if an integral unit, can be attached to surface 10 using a high-thermal-conductivity epoxy if the expected temperature is not so high as to damage the epoxy. For higher temperatures, an air brush (not shown) could be used to deposit thermographic-phosphor layer 14 as a thin layer directly onto surface 11. Thermographic-phosphor layer 12 would then be deposited as a thin layer on top of layer 14. With air-brush deposition, the thermographic phosphors are mixed with a high-temperature binder.

Other methods of depositing layers 12, 14 include E-beam deposition and RF sputtering. If desired for protection of optical heat-flux gauge 10 at low temperatures, a thin layer of a transparent material having high thermal conductivity could be deposited over thermographic-phosphor layer 12.

It is important that the phosphor layer 12 be thin enough to permit a substantial portion of light from lamp 15 to pass through layer 12 and into layer 14. With some thermographic phosphors whose optical-absorption coefficients do not permit a substantial portion of light from lamp 15 to pass through thermographic-phosphor layer 12, it will be necessary to embed the thermographic phosphor material into an insulating transparent matrix which is capable of not being damaged by the expected temperature ranges. This insulating transparent matrix could be uv-transparent glass, or a glass-like matrix.

To insure that incident heat flux 13 can be accurately determined, it is, of course, necessary that thermographic-phosphor layer 12 comprise a thermographic phosphor different than the thermographic phosphor which comprises thermographic-phosphor layer 14. This is so that the different materials will exhibit different spectral lines for the same or different temperatures of layers 12, 14.

The choice of the materials for thermographic-phosphor layer 12 and thermographic-phosphor layer 14 initially involves choosing thermographic phosphors which have high rates of change in emission spectra over the temperature range of interest for surface 11. Presently, thermographic phosphors are available over the range of 0K to 2000K. The choices of particular thermographic phosphors for layers 12, 14 are subject to the criteria for the intended application. Two thermographic phosphors which could be used are $YVO_4$:EU and $YVO_4$:Dy.

Light source 15 can be an ultraviolet lamp or a laser having efficiency and accuracy. Light source 15 should operate at a wavelength which will most efficiently excite the desired spectral lines of the chosen phosphors. A wavelength that is acceptable for many applications and that is readily available from commercially available uv lamps or lasers is 254 nm. Of course, any light source that, such as a mercury lamp can produce a wavelength slightly shorter than the shortest-wavelength emission line of thermographic-phosphor layers 12, 14 can be used to produce luminescences 16, 17.

Luminescences 16, 17 contain sufficient information through interpretation of their spectral lines to determine the temperatures of thermographic-phosphor layer 12 and thermographic-phosphor layer 14. With the temperature information, the heat flux, Q, can be calculated using the formulae developed herein.

The embodiment of a means for collecting and interpreting luminescences 16, 17 is also illustrated in FIG. 1. As illustrated schematically, light from light source 15 is focused by lens 13 onto the top surface of gauge 10. As a result, luminescences 16, 17, being phosphor luminescences indicative of temperature, are emitted from gauge 10, and are collected by lens 22 and inserted into optical fiber 24 for transmission into spectrometer 26 through a lens coupler (not shown).

Spectrometer 26 receives luminescences 16, 17 through optical fiber 24, and the resulting luminescence signal is dispersed and collected on diode array 28, which, for example, may be an EG&G Reticon, diode array. The data from diode array 28 is recorded and processed by optical multichannel analyzer (OMA) 30, which may be an EG&G model 1460 optical multichannel analyzer. Optical multichannel analyzer 30, having internal computer 30a, is a conventional optical multichannel analyzer, and converts light incoming on optical fiber 24 into electrical signals. These electrical signals are then analyzed by computer 30a to determine heat flux 13, using the temperature differences between thermographic-phosphor layer 12 and thermographic-phosphor layer 14.

Figure 3:
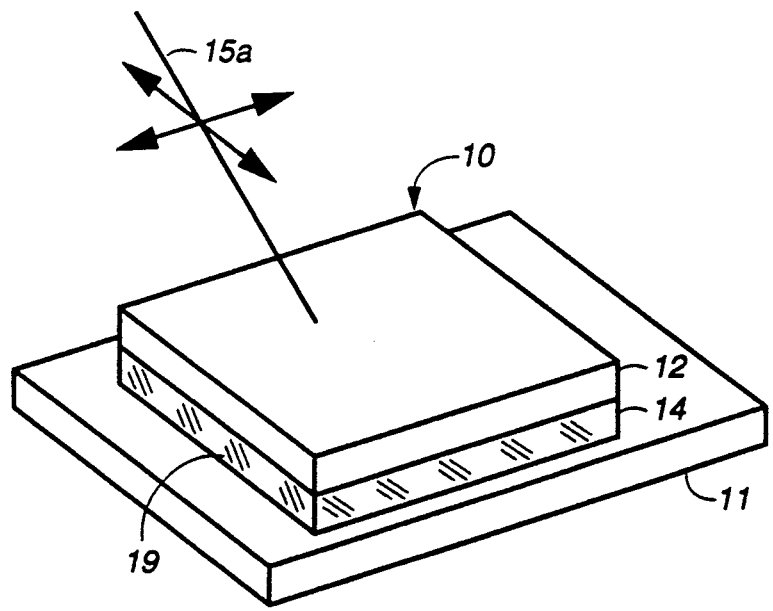
FIG. 3 is a perspective view of a heat-flux gauge according to the present invention deposited over a section of a surface for which spatial heat flux information is desired, with the light source scanning the surface of the gauge.

In an embodiment of the invention, spatial distribution of heat flux across a surface may be accomplished by depositing heat-flux gauge 10 over the area of surface 11 for which measurements of heat flux are desired. Such an arrangement is shown in FIG. 3. Here, the light 15a from light source 15 (FIG. 1) is scanned across gauge 10, and the luminescences (not shown) from different points on gauge 10 is gathered by lens 22 (FIG. 1). By this method, flux rates for discrete areas of surface 11 can be monitored. FIG. 3 also illustrates thermographic layer 14 embedded into transparent matrix 19.

The foregoing description of embodiments of the present invention has been presented for purposes of illustration and description. It is not intended to be exhaustive or to limit the invention to the precise forms disclosed, and obviously many modifications and variations are possible in light of the above teachings. The embodiments were chosen and described in order to best explain the principles of the invention and its practical applications to thereby enable others skilled in the art to best utilize the invention in various embodiments and with various modifications as are suited to the particular use contemplated. It is intended that the scope of the invention be defined by the claims appended hereto.

What is claimed is:

1. An optically interrogated gauge for measuring heat flux incident on a surface comprising:
    a first thermographic phosphor in direct contact with said surface;
    a second thermographic phosphor overlying said first thermographic phosphor;
    light means incident on said first and second thermographic phosphors, for producing first luminescence from said first thermographic phosphor and second luminescence from said second thermographic phosphor;
    collecting means for collecting said first and second luminesces, wherein said first luminescence and said second luminescence are indicative of the temperatures of said first and second thermographic phosphors; and
    computing means connected to said collecting means for determining heat flux on said surface using numerical differences between said temperatures of said first and second thermographic phosphors.

2. The heat-flux gauge as described in claim 1, wherein said first thermographic phosphor is embedded in a transparent matrix and said second thermographic phosphor overlies said first thermographic phosphor embedded in said transparent matrix.

3. The heat-flux gauge as described in claim 2, wherein said transparent matrix comprises a glass or glass-like matrix.

4. The heat-flux gauge as described in claim 1, wherein said first thermographic phosphor comprises $YVO_4$:Eu.

5. The heat-flux gauge as described in claim 1, wherein said second thermographic phosphor comprises $YVO_4$:Dy.

6. The heat-flux gauge as described in claim 1, wherein said light means comprises a mercury lamp.

7. The heat-flux gauge as described in claim 1, wherein said light means comprises a laser.

8. The heat-flux gauge as described in claim 1, wherein said light means is scanned across said second thermographic phosphor to determine heat flux on a plurality of points on said surface.

9. A method of determining heat flux incident on a surface comprising the steps of:
    depositing a first thermographic phosphor on said surface;
    depositing a second thermographic phosphor over said first thermographic phosphor;
    illuminating said second thermographic phosphor and said first thermographic phosphor with light to produce first luminescence from said first thermographic phosphor and second luminescence from said second thermographic phosphor;
    collecting said first and second luminescences; and
    computing said heat flux incident on said surface from information contained within said first and second luminescences.

10. The method as described in claim 9 wherein said step of illuminating said second thermographic phosphor and said first thermographic phosphor with light further comprises illuminating a plurality of points on said second thermographic phosphor and said first thermographic phosphor to allow spatial determination of said heat flux on said surface.

* * * * *